3,084,254
BURST JACKET DETECTION IN NEUTRONIC REACTORS
Jean Goupil, Fontenay-aux-Roses, Jean Mégy, Paris, and André Roguin, Antony, France, assignors to Commissariat a l'Energie Atomique, Paris, France, a state administration
Filed Oct. 23, 1958, Ser. No. 769,226
Claims priority, application France Oct. 26, 1957
18 Claims. (Cl. 250—83.6)

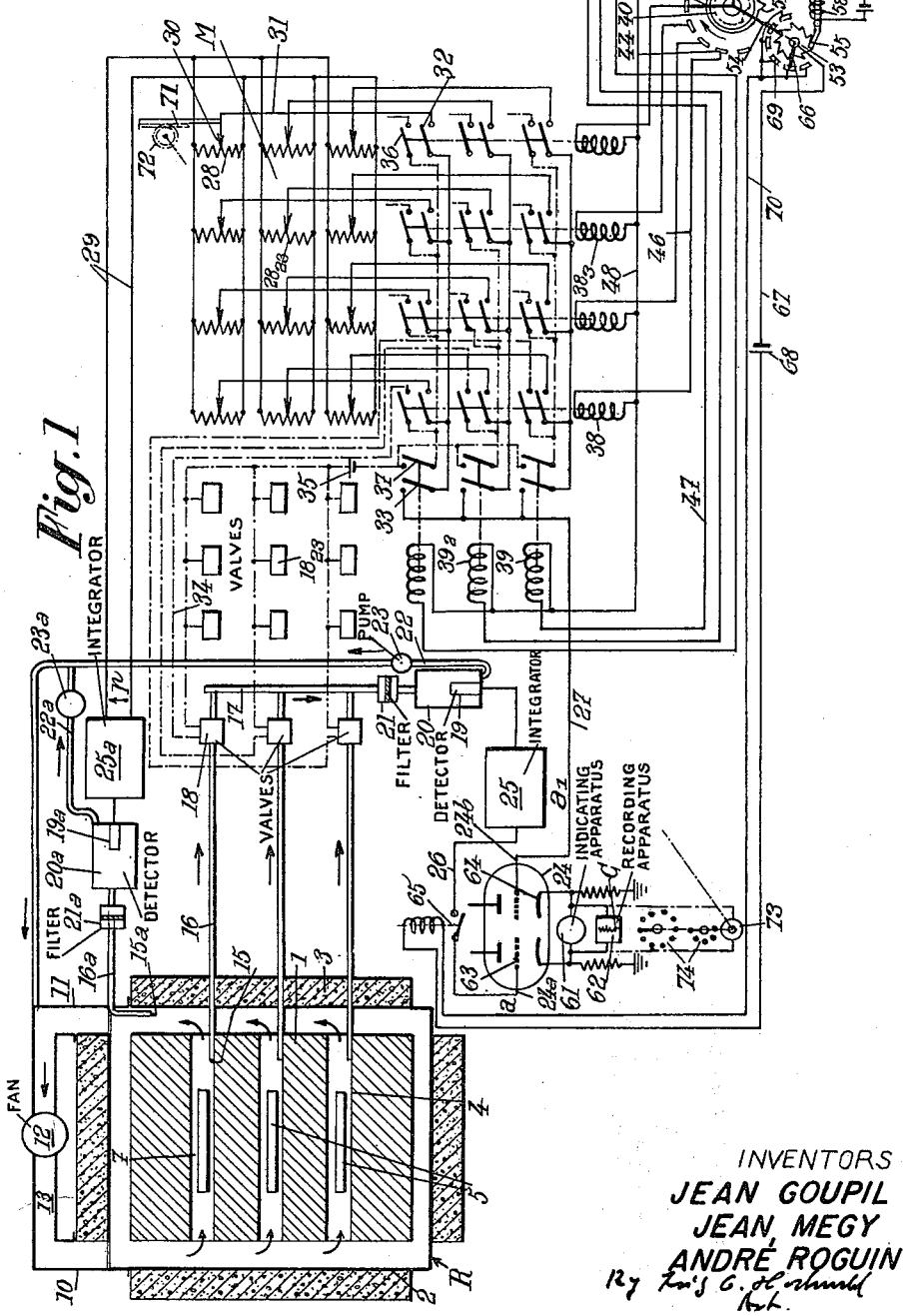

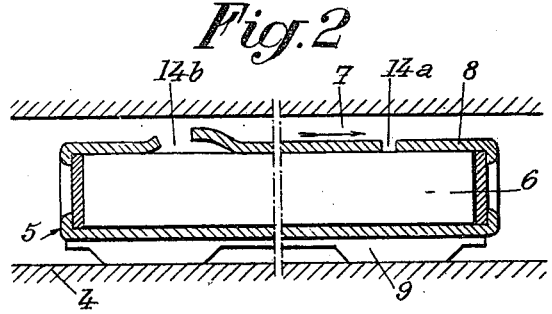
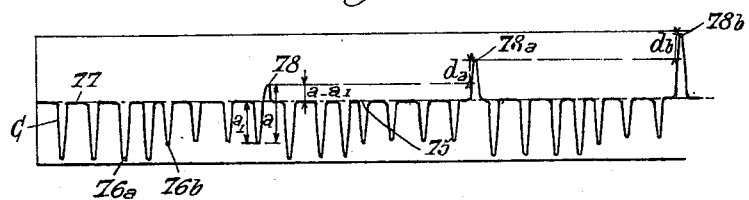
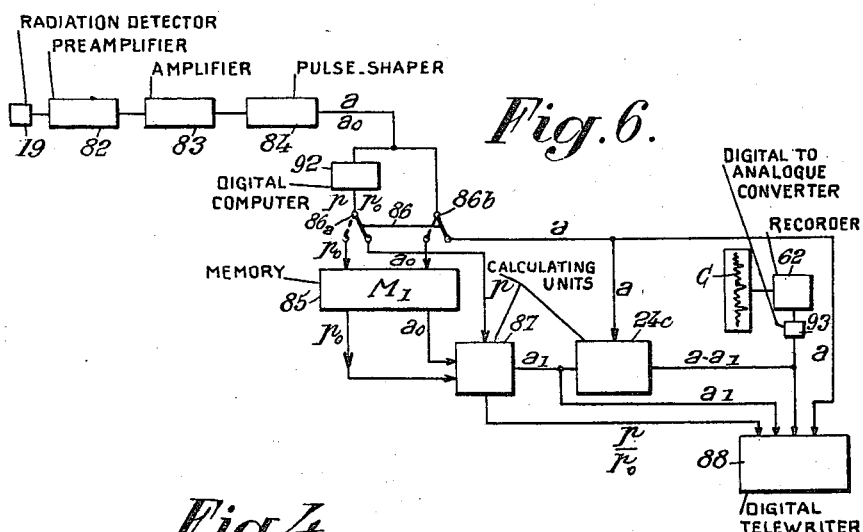
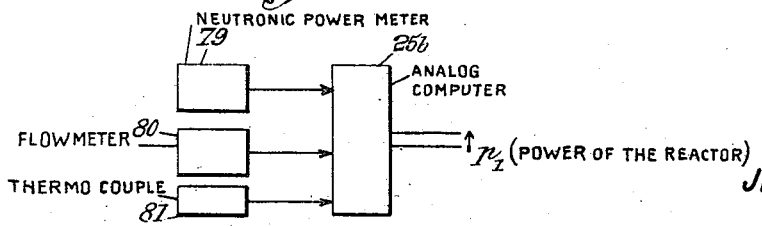

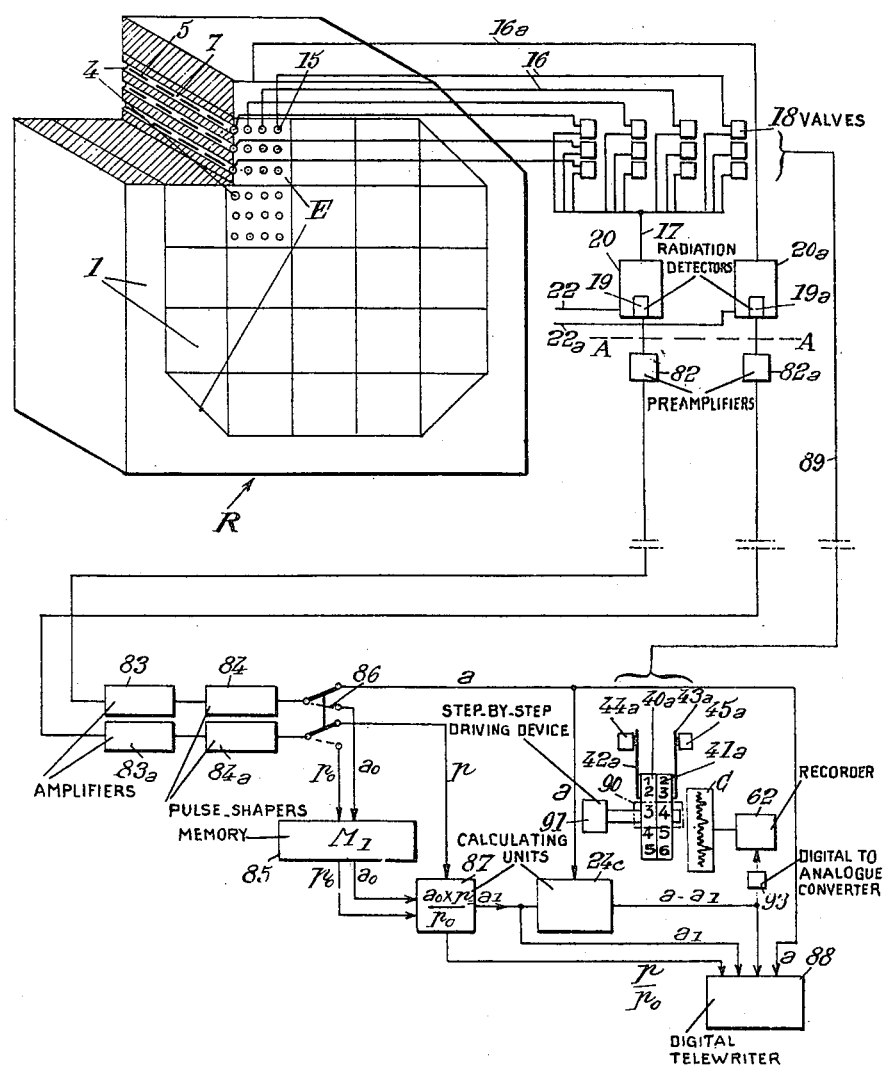

The present invention relates generally to neutronic reactors and, more specifically, to the detection of the occurrence of leaks or other failures in the jackets (e.g. of the slugs or cartridges of nuclear fuel) used in such a reactor.

It is well known that, in heterogeneous neutronic reactors having a solid moderator, the slugs of fissionable or fissile material (uranium or uranium oxide eventually enriched in U235 isotope, plutonium) are disposed in a plurality (often over a thousand) of channels provided in a solid moderator block (as graphite), thereby forming a fuel-moderator lattice, for example an uranium-graphite lattice, so that the neutrons, released by natural fission in the uranium discrete bodies and suitably slowed down by the graphite mass, cause additional fissions of the U235 atoms in the uranium body, thereby setting up a chain reaction.

In the case of power station reactors, such a chain reaction produces a large amount of heat which is removed from the reactor by circulating through said channels around said slugs, a coolant fluid (e.g. air, carbon dioxide, light or heavy water), either in an open cycle if the fluid is readily available (air, light water) or in closed cycle, the removed heat being utilized e.g. for the production of steam intended for driving turbines.

In such fluid cooled reactors it is essential to prevent corrosion of the fissionable material by the coolant and also to prevent any escape of the fission products (which are highly radioactive materials emitting $\beta$ and $\gamma$ rays) in the coolant fluid. This is why the fissionable material is separated from the coolant fluid by a jacket or can. Therefore the slugs or cartridges disposed in a channel of a nuclear reactor consist of a body of fissionable material hermetically sealed in a suitable metallic container (or clad by a sheath) in a metal or alloy such as magnesium, aluminum, Al-Mg alloy or stainless steel.

Power ractors of this type exist in France at Marcoule, with horizontal channels, and, in Great Britain at Calder Hall (described in "Nucleonics" December 1956, p. S10–S25), with vertical channels.

Another type of heterogeneous reactors uses a liquid moderator (as pressurized light water or heavy water), wherein dip elements comprising fissionable and/or fertile material, a coolant fluid circulating through channels disposed in all said elements or in some elements. In such reactors also, and for the above-mentioned reasons, it is necessary to isolate, by means of fluid-tight jackets or cans, the bodies of fissionable and/or fertile material from the coolant fluid. With such problems are particularly concerned the breeder reactors comprising a core or seed assembly with fissionable material (e.g. uranium enriched in U235 isotope) and a blanket with fertile material (e.g. natural uranium or thorium), the coolant fluid circulating through the blanket elements. A reactor of this particular type has been constructed at Shippingport (Pennsylvania, United States) and described in "Nucleonics," April 1958, p. 53–72.

But, even if all the steps are taken, when manufacturing such fuel slugs, for realizing the perfect canning or cladding thereof, leaks of the jackets or cans are unavoidable. Experience has shown that when leaks occur in a jacket or can, said leak opens first slowly and that, after a relatively long delay, the leak increases considerably and the jacket opens thereby increasing the contact surface area between the fissionable and/or fertile material and the coolant fluid. Fission products arrive thus in surrounding coolant thereby producing a substantial pollution or contamination of the coolant fluid leaving the channel wherein said cartridge or slug is disposed and permitting the fluid to enter inside said cam and react on the fissionable material. Such a leak therefore has two important consequences:

The coolant fluid leaving the reactor has an increased radioactivity or delayed neutron content; it may, in particular, produce a contamination of the atmosphere or the river in which the air or light water, in the case of an open cycle, is discharged;

It produces a swelling of the slug, said swelling rendering more difficult or even preventing, on the one hand, the passage of the coolant fluid through the channel wherein the swelled slug is located and, on the other hand, the extraction or discharge of the swelled slug from said channel.

It is therefore very important to detect as soon as possible any failure in the fluid-tightness of the cans enclosing the fissionable and/or fertile material in a nuclear reactor and to localize the channel wherein the burst can is disposed so as to take all necessary steps for preventing an accident or other default in the reactor.

Several burst-slug detectors have been devised and commercially used. Such detectors are particularly disclosed in French Patent 1,127,618 patented August 13, 1956, in "Nucleonics," December 1957, p. S20–S21 (as used at Calder Hall, Great Britain) and in "Nucleonics," April 1958, last paragraph of the portfolio between pages 56 and 57 (as used at Shippingport, Pennsylvania).

The known burst-slug detector devices are based on the determination of the absolute value of the activity, e.g. $\beta$ activity or neutronic activity of each elementary coolant flow issuing from one channel (or from one group of channels) of a neutronic reactor, without establishing a difference between the activity modifications due to variation of the activity of the whole reactor and the activity modifications resulting from a burst slug in heat exchange relationship with said coolant flow.

Said known detectors do not therefore give, in all cases, a quick and accurate indication of the occurrence of a leak in the slug cans, because the radioactivity (or other ionizing activity) of the effluent of one channel depends on three main factors, i.e.:

The presence in said effluent of fission products resulting from a leak in a can;

The presence, in said effluent, of same fission products resulting from the occurrence of uranium compounds on the external surface of a can, or of the channel due e.g. to a leak of a can which was previously disposed in said channel;

The total activity of the reactor, due e.g. in case of air as coolant to argon 41.

In fact, in the known devices a very important ionizing activity originates from the activity of the coolant fluid itself and the fissionable material outside the cans (on the external surface of the cans and in the channels). Furthermore, when the power of the reactor decreases, a higher radioactivity resulting from a leak may be masked by the decrease of the whole activity of the effluent. Therefore, the known detectors do not detect leaks occurring in such conditions and experience has taught that most of the leaks occur when the activity of the reactor is varied, due to the thermal strains to which are submitted the cans or jackets during the heating or the cooling thereof.

It is therefore an object of the invention to provide a method and a device enabling the safe and immediate detection of any leak occurring in the jackets disposed inside heterogeneous neutronic reactors.

It is another object of the invention to provide means for determining the variation of the radioactivity of the effluent from a channel, or a group of channels, in a neutronic reactor, relatively to a basic radioactivity thereof, taking into account the variation of activity or power of the whole reactor.

It is still another object of the invention to provide means for determining the evolution of a failure occurring in a jacket inside such reactor.

According to the invention, the actual activity of each effluent elementary coolant flow leaving a neutronic reactor is compared with a reference activity corresponding to the activity of said coolant flow at a reference moment, corrected by a coefficient substantially equal to the ratio of the actual gross activity or power of the reactor to the gross activity of said reactor at the reference moment, thereby determining the eventual excess of the actual ionizing activity of said coolant flow relatively to the value said activity would have in the absence of failures in the jackets in heat exchange relationship with said coolant flow.

The invention, has, therefore, for an object, a method for detecting leaks in the jackets of jacketed bodies of fissionable material disposed inside a heterogeneous neutronic reactor, cooled by a series of fluid streams circulating through said reactor in heat-exchange relationship with said jacketed bodies, comprising determining and storing the activity of the ionizing radiations given off by each one of said fluid streams leaving said reactor at reference moment, for a given power of said reactor, determining the actual activity of the ionizing radiations given off by each one of said fluid streams leaving said reactor, determining the actual power of said reactor and comparing, successively for each one of said streams, said actual activity to the stored activity of same stream multiplied by a factor taking account of the power modification of said reactor.

The invention has also for an object a device for detecting leaks in the jackets of jacketed bodies of fissionable material disposed inside a heterogeneous neutronic reactor, cooled by a series of fluid streams circulating through said reactor in heat-exchange relationship with said jacketed bodies, comprising at least one detector for determining the activity of the ionizing radiations, and means for bringing representative samples of said fluid streams in front of said at least one detector in order to permit the determination of the ionizing activity thereof, means for storing the successive indications of said at least one detector for said fluid stream at a reference moment for a reference power of said reactor, means for determining the actual power of said reactor, means for correcting the stored indications so as to obtain corrected stored activities referred to the actual power of said reactor, means for comparing, for each fluid stream, the actual value of the ionizing activity of said stream, as determined by said at least one reactor, to said corrected stored activity thereof, and means for visualizing the difference between said actual value and said corrected stored activity, for said fluid streams.

The aforesaid and other objects, features and advantages of the invention will be more easily and fully understood from the illustration of several embodiments of a burst jacket detection device according to the invention, being understood that the invention is not restricted to the details of the illustrated and described embodiments, but that it is susceptible to modifications and adaptations.

In the attached drawings:

FIGURE 1 shows a first embodiment (of the analogous type) of a burst jacket detection device according to the invention applied to a heterogeneous neutronic reactor with a solid moderator as at Marcoule (France).

FIGURE 2 is an enlarged section taken across a burst slug.

FIGURE 3 shows the type of graph that can be obtained with the detection device according to FIGURE 1.

FIGURE 4 shows a modification of a portion of the device according to FIGURE 1.

FIGURE 5 shows another embodiment of the digital type of a burst jacket detection device according to the invention.

FIGURE 6 shows a modification of a portion of the device according to FIGURE 5.

On FIGS. 1 and 5 is shown a neutronic reactor R comprising a moderator block 1 surrounded, in the known manner, by a thermal shield 2 and a biological shield 3 in dense concrete (said shields 2 and 3 being not illustrated on FIG. 5). The moderator block 1 (e.g. in graphite) is traversed by a plurality of parallel channels 4 which are generally either vertical (as at Calder Hall), or horizontal (as at Marcoule and as illustrated). Although in graphite-moderated gas-cooled neutronic reactors, one or several thousands of channels are provided in the moderator block, only three such channels are represented in the vertical cross-section of FIG. 1, in order to clarify the drawing and corresponding description, but in FIG. 5 were shown a plurality of channels and the way said channels may be divided in several groups E delimitated by a rectangle (or a triangle) each such group E including, in FIG. 5, twelve channels. The embodiments of FIGS. 1 and 5 are illustrated and described hereinunder for detecting a burst slug in a group of twelve channels in order to simplify the drawing, but of course the number of channels 4 per group E is generally much higher (it may be of about hundred for power station reactors including over thousand channels).

In each channel 4 are disposed one or several slugs 5 of fissionable material according to the type of the reactor. Such a slug is shown in FIG. 2 and generally comprises a body 6 of fissionable material (e.g. natural uranium, uranium enriched in its U235 isotope either in the metallic form or as an oxide or other compound) isolated from the atmosphere or coolant stream 7 of the channel by a jacket or can 8 realized, generally, in magnesium, aluminum, magnesium-aluminum or stainless steel. Said jacket 8 is fluid-tight in order to prevent any contact between said atmosphere 7 (constituted by a fluid stream circulating in the direction of the arrow) and the element 6, and therefore, preventing first any reaction between said atmosphere and the fissionable body and secondly any escape of the fission products, which are highly radio-active by emitting $\beta$ and $\gamma$ rays, into said atmosphere. As shown in FIG. 2, the slugs 5 may comprise fins 9 which locate the slugs in the channels 4 and determine a fluid passage through said channels around said slugs.

In fact, in the power reactors, a coolant fluid is circulated through the channels 4 in heat-exchange relationship with slugs 5, in order to prevent any overheating of said slugs, as a consequence of the fission chain reaction taking place therein, and in order to carry away the heat which may be used e.g. for driving a gas or steam turbine having an electric generator associated thereto. In FIG. 1 it is shown how the coolant fluid arrives through a duct 10 and, after passing through all said channels 4, leaves the reactor R through a duct 11. If the coolant fluid is easily available (water or air), it is possible to discard said fluid (once—through cooling), after having taken all precautions in order to prevent the contamination of the atmosphere or the river in which the air or water is respectively rejected; but when fluids having a certain value, such as carbon dioxide, helium, heavy water, are used, or when a contamination is to be feared, the coolant fluid is recycled, e.g. by means of a fan or pump 12, provided in a duct 13, the circulation of the coolant fluid being shown by arrows on FIG. 1.

As above mentioned, any failure of a jacket 8 will have a detrimental influence on the reactor operation. A jacket burst, which is first limited as shown at 14a (FIG. 2) will become larger and open in course of time to become as shown at 14b thereby considerably increasing the contact surface between atmosphere 7 and fissionable body 6. The coolant fluid will become more and more radioactive, as fission products will pass in said fluid; furthermore, said fluid enters through the open slot 14b and may react on the fissionable material and produce a swelling of the body 6, thereby preventing the discharge of burst slug 5 from the channel 4 in which it is inserted and reducing the coolant circulation through said channel: such slug 5 may then become overheated. Therefore it is necessary to detect promptly any burst can.

According to the invention, each channel 4, or individual set of channels, is monitored in order to detect the occurrence of a failure in any of the slugs disposed in said channel or set of channels. It will be supposed for the further description that the channels are monitored one by one; but the same burst slug detection device may be used when, instead of one channel, one set of channels is monitored as a unit and the complete detection is performed set by set.

At the exit or downstream end of each channel 4 (or set of channels) is disposed the mouth or end 15 of a pipe 16 which collects a portion of the coolant leaving said channel (or set of channels). The ratio of the collected fluid to the total coolant effluent may vary from one channel (or set of channels) to the other, as generally the mass flow of coolant fluid through the various channels of an heterogeneous nuclear reactor is not the same and as it may be preferable to collect substantially the same flow through each pipe 16; said ratio may be comprised e.g. between about 1% (or even less) and 10% (or even more), about 2% being the preferred ratio.

All the pipes 16 of a same group E of channels end in a common tubular collector 17, a valve 18 (e.g. an electro-valve or solenoid valve) being disposed in each pipe 16. There exists therefore as many collectors 17 as groups E and as many valves 18 as channels (or sets of channels) to be monitored in the whole reactor.

In order to simplify the disclosure of the embodiments, the following description will deal only with one group E of e.g. twelve channels (or sets of channels) for which the twelve valves 18 are arranged in FIGS. 1 and 5 according to a rectangular table or matrix comprising three lines and four columns.

By means which will be described hereinunder, the normally closed valves 18 of said table are opened cyclically one by one, in order to transfer to collector 17 successively samples of the coolant fluid collected from each one of the monitored channels (or sets of channels). The successive samples are circulated in front of a detector 19. For example the coolant fluid may travel about 50 to 100 feet (at the speed of about 30 to 70 feet per second) between mouth 15 and the detector (or the associated filter 21 mentioned hereinunder).

Several types of detecting means and detecting aids may be used, according to the coolant fluid.

If the coolant fluid is air, the detection may be realized, as shown in FIG. 1, by means of a Geiger-Müller counter 19 with a glass window disposed in a chamber 20 of a sufficient volume (e.g. about 2 liters) traversed by the successive samples of coolant fluid arriving through collector 17. In order to facilitate the measure of the radioactivity (or other ionizing activity) of the fission products which may escape through slot 14a or 14b, said radioactivity being distinguished from the radioactivity of the coolant fluid proper, it is possible to dispose upstream said chamber 20 a filtering element 21 (wherein the filter proper may be constituted e.g. by paper, metallic wool or an assembly of fibers having a diameter of about 1 micron). Only the gaseous products of collector 17 arrive in chamber 20 wherein counter 19 detects essentially the radioactive xenons and kryptons (or the rubidiums and cesiums daughters) of said xenons and kryptons, the detected activity of the coolant air being due especially to argon 41 originating from argon 40 which is present in the air.

If the coolant fluid is carbon dioxide, the detector may be constituted by a scintillation counter, especially a counter sensitive to $\beta$ radioactivity (scintillation counters are for example disclosed in "Nucleonics," April 1956, p. 34–53). In all cases when the coolant fluid is a gas, it may be advantageous to provide, in chamber 20, charge collecting means, e.g. an electrostatic precipitator, the collected charges being after precipitation brought in front of detector 19. Convenient collecting means, which generally comprise essentially a negative electrode on which the charges are collected, are described in the Proceedings of the International Conference on the Peaceful Uses of Atomic Energy held in Geneva 1955 (vol. 3, p. 88), in the January 1955 issue of "Nucleonics" (p. 51–52), in the December 1956 issue of "Nucleonics" (p. S20–S21) and in U.S. Patent 2,576,616 issued November 27, 1951.

At last, when a liquid coolant such as water is used, neutron counters (as fission chambers, boron-lined chambers) may be used, as in coolant water the main ionizing activity is due to neutrons. Suitable devices for detecting the neutrons are disclosed in U.S. Patent No. 2,823,179, issued February 11, 1958, and in April 1956 issue of "Nucleonics," on p. 45 and 46, as shown on FIG. 5, the filter element 21 may be omitted for liquid coolants.

After having been checked for ionizing activity the coolant fluid picked-up by pipes 16 is returned via duct 22, by means of a pump 23, to the duct 11 and the monitored coolant portion may be recycled as shown on FIG. 1.

The portion of the device having been described until now is similar to the device disclosed in French Patent 1,127,618, patented August 13, 1956, and also to the devices used for monitoring the British Calder Hall and U.S. Shippingport above-mentioned reactors.

But in these prior art burst jacket detecting devices, the indications given by detector 19, i.e. the values measuring the absolute $\beta$, $\gamma$ or neutronic activities of the fluids leaving each channel (or set of channels) were directly visualized and/or recorded. But these absolute values present the drawback to depend, first, on the eventual existence of a jacket failure, secondly, on the presence of fissionable material (for example uranium oxide) either on the external surface of a jacket (although the jackets were very carefully cleaned) or in the channels, due to a previous jacket failure, and, thirdly, on the power of the reactor. Therefore, with the prior art devices, a jacket burst is not always detected by detector 19, because, in the output thereof, the excess radioactivity due to said failure may be masked, for a small burst, by the background noise resulting from the normal radioactivity of the fluid leaving the channel (due e.g. to argon 41) and, for an even important burst, by a simultaneous reduction of the total activity (i.e. power) of the reactor and experience has shown that sheath failures occur especially during the power variations of the reactors, i.e., during the periods when the slugs, particularly the slugs sheathes, are submitted to important thermal stresses.

It is why, according to the invention, the excess of ionizing activity of the fluid stream leaving each channel (or set of channels) on the activity said stream would have if no passage of fission products in said stream occurred, in other words the relative value of the activity of the fluid stream leaving each channel (or set of channels), is determined by using a differential or null method and by storing the value of the normal activity (i.e. in the absence of any failure) of each channel (or set of channels) for a given power of the reactor.

Therefore, according to the gist of the invention, the successive counts of counter 19 are fed to a comparator 24 (FIG. 1) or 24c (FIG. 5) receiving simultaneously the stored values, for each channel (or set of channels), of the activities at a reference moment, corrected by a factor taking account of the power variation of the reactor since said reference moment.

The storing and the comparison may be realized, without departing from the scope of the invention, either in an analogous system (using physical variables) or in a digital system (using numbers or digits). In a first type of embodiments of the invention, analogous means are used for determining and storing the activities of the various channels whereas in a second type of embodiments digital means are used for determining and storing said activities. In both types of embodiments, cyclic switching means must be provided for sending on comparator unit 24 or 24c the stored value of the reference activity of a certain channel (or set of channels) and for acting on valve 18 corresponding to same channel (or set of channels) to direct on detector 19 a sample picked up in said channel (or set of channels).

I. *Analogous Embodiment*

Such an embodiment is shown on FIG. 1. In this embodiment, the detector 19 supplies an integrator 25, of a known type generally associated to a radioactivity detector, which in turn delivers, through an electric line 26, a unidirectional voltage $a$ to a first input 24a of comparator 24, this voltage $a$ increasing as the radioactivity detected by the detector 19 increases; the second input 24b of coparator 24 receives, through a line 27, a unidirectional voltage $$a_1 = \frac{p \times a_0}{p_0}$$

which is equal to the product of voltage $a_0$ (corresponding successively to the original activities of the various channels) by a coefficient $p/p_0$ equal to the ratio between the power $p$ of the reactor at the present moment and the power $p_0$ of the reactor at the reference moment.

In the device of FIG. 1, the memory system M storing the reference activities is constituted by a series of potentiometers 28, the number of which is equal to the number of channels (or sets of channels) monitored by the detection device according to the invention. On FIG. 1, is shown a table or matrix of twelve potentiometers corresponding to the table of valves 18; all these potentiometers 28 are fed in parallel, through two leads 29, by a voltage $p$ (or $p_0$ at the reference moment) representing the total activity or power of the reactor and delivered by a unit 25a, the nature of which will be disclosed hereinunder.

The output of each potentiometer 28 is deducted by a runner or slider 30 which is connected by a lead 31 to the common lead 27 through two switches 32 and 33. In the same manner, the leads 34 (of which only some were shown) controlling the valves 18 (which may e.g. be constituted by electro-valves of the type disclosed in U.S. Patent 2,694,335 issued November 16, 1954, fed from a common voltage source 35) are each interrupted by a switch 36 and by a switch 37. At each switch 32 is locked a switch 36 and at each switch 33 is locked a switch 37, so that the closing of a pair of switches 32—36 and of a pair of switches 33—37 has for result that, on the one hand, one pipe 16 delivers in collector 17 through one valve 18 (e.g. $18_{23}$) opened by said closing and, on the other hand, the exit of the potentiometer 28 (e.g. $28_{23}$) which occupied in its table the same position as the opened valve 18 in its own table feeds line 27.

The pairs of switches 32—36 are disposed according to a table or matrix similar to the tables of potentiometers 28 and valves 18 and they are controlled by a first series of relay coils 38 disposed along the columns of the table of switches 32—36; on the contrary the pairs of switches 33—37 are controlled by a second series of relay coils 39 corresponding to the lines of the table of switches 32—36.

It is easily seen that the simultaneous excitation of a coil 39 and a coil 38, closing a pair 33—37 and a pair 32—36, has as a result:

To deliver on line 27, the exit of one of the potentiometers 28, i.e. the potentiometer which occupies the line and the column corresponding to the line and column occupied by the excited coils: for example, if the coil $39_2$ (second line) and $38_3$ (third column) are excited, potentiometer $28_{23}$ will supply said line 27;

To bring in front of detector 19 a sample selected by a pipe 16, i.e. the pipe which is controlled by the valve 18 occupying the same line and the same column as said potentiometer (for example valve $18_{23}$).

The cyclic control means of coils 38 and 39 may be of any known type. On FIG. 1 was shown, by way of example, one of the possible embodiments of a convenient cyclic switch; such a switch may comprise, in the known manner, two plates or discs 40 and 41 driving each one a conducting arm 42, 43, cooperating with stationary contacts 44, 45 respectively. Each one of contacts 44 is connected, through a lead 46, to one of the terminals of a relay coil 38 whereas each of the contacts 45 is connected, by means of a lead 47, to one of the terminals of a relay coil 39, the other terminal of all coils 38 and 39 being connected, by a common lead 48, to one of the terminals of a voltage source 49, the other terminal of said source being connected, by a lead 50, to the conducting arms 42 and 43.

The two discs 40 and 41 are designed so that the first disc 40 (which is driven step-by-step as it will be disclosed hereinafter) drives the second disc 41 of one step after it has itself performed a complete revolution and, therefore, the first disc 40 may comprise, in the known manner, a tooth 51 which cooperates with teeth 52 carried by the second disc 41. On FIG. 1, each step of the first, as of the second, disc corresponds to a rotation of 36°, ten contacts 44 and ten contacts 45 being provided, such an embodiment corresponding to a burst jacket detecting device comprising the same detector 19 for monitoring hundred channels (or sets of channels), only twelve of the valves 18, potentiometers 28 and associated elements being represented in order to clarify the drawing.

The step-by-step driving device for disc 40 may comprise, for example, a ratchet-wheel 53 secured on same shaft 54 at disc 40 and driven step-by-step by a ratchet 55 ending a plunger 56 moved periodically, against the action of a return spring 57, by a coil 58 when said coil is excited by the closing of relay 59, the coil of said relay receiving successive pulses from a pulse generator 60 of a known type.

As concerns comparator 24, which deducts the difference between the voltages $a$ and $$a_1 = \frac{a_0 \times p}{p_0}$$

applied respectively on its inputs 24a and 24b and which delivers said difference to an indicating apparatus 61 and/or a recording apparatus 62 (the nature of which will be disclosed hereinafter), it may take several embodiments. It may be constituted, for example, as shown and comprise a double triode (or two triodes), having the grids 63 connected to the entries 24a and 24b and the cathodes 64 grounded through resistances, the difference between the two inputs of said comparator appearing between said two cathodes and being impressed on the terminals of the indicating and recording apparatuses 61 and 62 disposed in parallel.

Furthermore, in order to take account of the variation of the reactor power level (aforementioned $p/p_0$ ratio), a further pick-up pipe for the coolant fluid may be provided, i.e. pipe 16a with its mouth 15a disposed in the channel 11, said pipe 16a feeding a further detector 19a similar to the detector 19 and disposed in a chamber 20a, downstream a filter 21a, the fluid flow picked up through pipe 16a being sent back, through a duct 22a by a pump or fan 23a, in the recycle duct 13. The exit of detector 19a is translated, in an integrator 25a similar to integrator 25, in a voltage $p$ (or $p_0$) which is a function of the power of the reactor, because pipe 16a picks-up a gross sample, wherein the eventual failure of a jacket plays a reduced part relatively to the activity of the whole coolant fluid circulated through reactor 1.

The analogous device for detecting burst jackets shown in FIG. 1 may also comprise a relay 65 which opens for a short period line 26 each time that the ratchet wheel 53 advances of one step and, therefore, said ratchet wheel may drive an arm 66 fed, by a lead 67, from one of the terminals of a potential source 68 and cooperating with contacts 69; said contacts 69 are arranged as contacts 44 and are all electrically connected, by a common lead through a relay coil 65, to the other terminal of said source 68.

The device may also comprise servo-mechanisms, allowing to set, at the reference moment, the runners 30, in order to store the reference activities $a_0$. For each runner 30, it is possible to provide (as shown for a single runner on FIG. 1) a rack 71 meshing with a pinion 72 driven in rotation by a reversible electric motor 73 (which may be similar to the motors 35 and 36 disclosed in U.S. Patent 2,694,335 issued Nov. 16, 1954), the rotation of which (with the direction of rotation) being controlled by the output of comparator 24. Of course, an assembly 71, 72 and even 73 is provided for each runner 30 (although only one of such assemblies was shown on the FIGURE 1); furthermore a cyclic switch 74, e.g. of the type shown in fuller detail at 40, 41 is provided for ensuring the successive control of the various elements 71 and 72 according to the output of comparator 24 for each monitored channel 4 of group E.

The operation of the detection device according to FIG. 1 is the following:

First for the preliminary setting of the runners or sliders 30, the reactor R operating for example at its normal power, the value of the radioactivity (or other ionizing activity) is determined and stored for the various fluids streams 7 leaving the reactor R. Therefore, for each channel 4 (or set of channels) in a same group E (for example for the channel controlled by the valve $18_{23}$), the output of the corresponding potentiometer (as $28_{23}$) is opposed, in the comparator 24, to the output of integrator 25, when the detector 19 analyzes the fluid passing through said valve, and this by moving, e.g. manually, the slider 30 of said potentiometer until the apparatus 61 will read zero i.e. will give a null indication (the recording apparatus 62 being for example disconnected during this preliminary setting). Such setting giving a null-balancing relationship is realized for each slider 30 by closing, e.g. manually, for passing from one channel to the other, the switch controlling the excitation of coil 58. The values of the various radioactivities $a_0$ of the channels, for a given power $p_0$ of the reactor, is thereby stored as the position of the plurality of runners 30.

Instead of realizing manually the positioning of sliders 30 of potentiometers 28 which ensures the apparatus 61 will read zero for each monitored (fluid stream), it is possible to control each slider by the servo-mechanism 71, 72, 73, 74, the motor 73 rotating either in one direction or in the other one according to the polarity of the output of comparator 24 and actuating therefore slider 30 until said output becomes equal to zero.

When this preliminary setting is performed, the burst jacket detection device according to the invention is able to operate automatically, the recording apparatus 62 being connected and the step-by-step rotation of the ratchet wheel 53 being controlled by the successive pulses of pulse generator 60. During its operation the comparator 24 receives during one cycle, i.e. during the analysis of each one of the fluid streams 7 of group E, on the one hand, on its entry 24a, the successive values $a$ of the actual (i.e. at the operating moment) activity of the fluid leaving the various channels 4 of the group E and, on the other hand, on its entry 24b, the successive values $a_1$ of the past or reference activity $a_0$ of same channels, corrected by the factor $p/p_0$ taking account of the power variation of the reactor $$\left(a_1 = \frac{a_0 \times p}{p_0}\right)$$

being understood that, due to the coupling of switches 32—36 and 33—37 the actual and reference values of same channel (or set of channels) arrive simultaneously on the two entries of comparator 24 which delivers the difference between said values.

The correction of the values at the reference moment in order to take account of the reactor power level variation is realized by applying between the terminals of each potentiometer 28 a voltage, which was originally (i.e. at the reference moment), substantially proportional to the reference power $p_0$ of the reactor at the said moment and which is, at each moment during the automatic operation of the detection device, substantially proportional to the actual power $p$ of the reactor; each runner 30 picks up, from this voltage, a fraction which is, for the corresponding fluid stream, equal to the part that said stream enjoyed in the total activity or reactor power at the reference moment. As long as no failure exists in the jackets monitored by detector 19, the signal leaving comparator 24 is substantially zero, the background noise being excepted, and this null value appears on the dial of measuring apparatus 61, which may be a voltmeter, and on the curve C drawn by the recording apparatus 62, which may be for example a M.E.C.I. apparatus of the Speedomax type manufactured by Leeds and Northup Co. of Philadelphia, Pennsylvania, including, on the one hand, a mobile index (drawing curve C), the displacement of which is proportional to the output voltage of comparator 24 and, on the other hand, on adjustable contact, the position of which is set, e.g., by hand at the reference moment, according to the chosen alarm activity; when said alarm activity is reached, the index touches said contact and closes an alarm electric circuit which comprises said index and said contact and a source of current potential; this alarm circuit discloses to the operators of the reactor that the alarm activity level is reached for a channel (or a set of channels) and that a burst jacket exists therefore in said channel (or set of channels). Further for a failure, for example in one jacket in the channel associated to valve $18_{23}$, a signal different from zero appears on dial of apparatus 61 and on curve C of apparatus 62 for said channel. It then appears that the relative values of the activities (i.e. the differences between the actual activity and the activity that said each channel should have if burst jacket existed ) is given by the detection device according to the invention.

Due to a refinement of the gist of the invention, it is possible, with such a detection device, to obtain also the measure of the absolute value of the activities of the various channels. It suffices therefore to interrupt the feeding of one of the inputs of comparator 24 during one portion of the time alloted for monitoring each channel (or set of channels), for example the feeding of input $a$ by the relay 65 when the arm 66 travels from one contact 69 to the other. The result is that the recording apparatus 62 will establish a curve of the type represented on FIG. 3 on which is shown in broken lines the horizontal line 75 corresponding to a null answer; the negative measures (under said line) correspond to an excess of entry 24b over entry 24a, i.e., during normal operation, to the opening of line 26 by relay 65. It is easily seen on this FIG. 3 that there are negative peaks 76a (corresponding to very active channels, for example the channels of the core of reactor R) and 76*b* (corresponding to less active channels, as the peripheric channels). The substantially horizontal portions 77 along the abscissae axis between two negative peaks correspond to a channel without burst jackets after the excitation of relay 65 (the background noise or grads being supposed equal to zero); on the contrary, when a failure exists, the exit signal of comparator 24, after the relay 65 has been excited, is not equal to zero, but as it is shown in 78. As the slot in the jacket opens and from shape 14*a* reaches shape 14*b* (FIG. 2), the signal 78 increases, due to the contamination of atmosphere 7 which is enriched in fission products, and passes to the values 78*a*, 78*b*, etc. . . . On FIG. 5, one has also shown the values $a$, $a_1$ and $a-a_1$.

It should be noted that, even if the increase of the failure or leak is slow, said leak will be detected by the detection device according to the invention as soon as the escape of fission products and consequently the contamination of the coolant fluid reaches a certain value above the background noise level due to the fact that, at each moment, the total leak is measured; on the contrary, in the detection device of the type described in the British review "Nuclear Power" of March 1957 on pages 91 to 95, wherein at each moment the actual activity is compared to the just preceding activity of each channel group, only the increments as $d_a$ and $d_b$ are detected, said increments being masked by the background noise as long as the leak varies slowly. In other terms, the just above-mentioned prior art device does detect the leaks only if their evolution is sufficiently high i.e. when the increments, such as $d_a$, between two measures, are superior to the background noise, whereas, with a device according to the invention, leaks with increments even inferior to the background noise are detected as soon as the total increase of the radioactivity of the fission products (sum of the increments) is greater than the background noise. Furthermore, the device according to the invention takes account of the reactor power level variation.

Instead of determining the reactor power variations by means of a supplementary or further detector 19*a*, to which arrives a fraction of the totality of the coolant fluid leaving reactor R (i.e. a given percentage of the mixed effluents of the different channels), it is of course possible to use other means adapted to determine or calculate the power of the reactor which is roughly proportional to the neutronic power and reversely proportional to the mass flow of the fluid coolant, the temperature variation of the coolant stream being only a correction factor when calculating the power of the reactor.

On FIG. 4 was shown schematically by blocks 79, 80 and 81 the conventional apparatuses of nuclear engineering adapted to measure the neutronic power (generally a compensated chamber with boron deposit), the flow of coolant fluid (generally a Venturi) and the temperature of this fluid (generally thermocouples); such apparatuses 79, 80 and 81, which are used in all nuclear reactors for controlling their operation, are described for example in the review "L'Onde Electrique" (Paris) N°. 343 (October 1955), p. 867 to 897 and N°. 321 (December 1953), p. 692–701 and the review "Nucleonics" (August 1957), p. 45–49. The indications of thees three apparatuses 79, 80 and 81 are fed in a calculating unit 25*b* (for example an analogous calculating unit) which generates, starting from the outputs of apparatuses 79, 80 and 81, a voltage $p_1$ which is substantially proportional to the power of reactor R. The output voltage $p_1$ is then used instead of voltage $p$ generated by integrator 25*a* in order to feed, in parallel, each one of the potentiometers 28.

II. *Digital Embodiments*

Instead of using a memory M storing the indications in an analogous form (for example by positioning potentiometer runners), it is possible to use, according to the invention, a memory $M_1$ storing the values of the initial activities in a digital form. A first digital embodiment is shown on FIG. 5.

On this figure, the portion disposed above line A—A, is similar to the corresponding portion of FIG. 1 and same reference numerals were given to the similar elements of FIGURES 1 and 5.

But the pulses generated by detectors 19 and 19*a* (the number of said pulses increasing with the activity of a sample of coolant fluid picked up by one of the tubes 16, for detector 19, and the reactor power, for detector 19*a*) are no more transformed in voltages $a$ and $p$ as in the embodiment of FIG. 1, but, on the contrary said pulses are, after amplification in preamplifiers 82, 82*a* and amplifiers 83, 83*a* respectively fed to discriminators 84 and 84*a* of a conventional type which shape the pulses so that they may be conveniently used in digital computers and storing devices; the number $a$ and $p$ of the normalized pulses delivered by discriminators 84 and 84*a* are representative of the activity of the fluid in collector 17 and in tube 16*a* respectively (the letters $a$, $p$, $a_0$ $p_0$, $a_1$ are used as well for the voltages as for the digits proportional to said voltages).

The sets of pulses at the reference moment (i.e. twelve numbers leaving unit 84 during a complete cycle, in the case of twelve channels 16, and one number leaving unit 84*a*) are stored in a memory $M_1$ which may be constituted for example by a magnetic drum 85 or by a magnetic tape, a memory tube, a punched-card device, a magnetostriction device, etc. Therefore, the double switch 86 is originally in the position shown in broken lines so that the exists of units 84 and 84*a* are inscribed in memory $M_1$.

This storing of the various numbers or digits takes place under any convenient form adapted to the nature of the memory, for example in series thereby avoiding a switching device similar to the one acting on the outputs of potentiometers 28 of FIG. 1.

During the normal further operation of the device, the double switch 86 is brought in the position shown in full lines and the outputs of discriminators 84 and 84*a* are sent respectively in a comparison or subtraction unit 24*c* and in a calculating unit 87 which also receives the digital values stored in memory drum $M_1$. The calculating unit 87 performs the operation $$\frac{a_0 \times p}{p_0} = a_1$$

wherein $a_0$ represents the output of memory $M_1$ corresponding to the successive outputs of discriminator 84 at the reference moment and $p$ and $p_0$ the outputs of discriminator 84*a* at the actual moment and at the reference moment respectively. In other terms, the calculating unit 87 calculates successively, for the various channels, the value $a_1$ (expressed in pulses) that the activity of the fluid leaving each channel should have if, in said channel no burst jacket exists. Therefore, the output of said calculating unit 87 is the translation in digital form of the signal which leaves line 27 in the embodiment of FIG. 1.

The device 24*c* which corresponds to comparator 24 of FIG. 1, is a calculating unit which performs the difference between the output of unit 87 and the actual output of unit 84 i.e. when the switch 86 is in the position shown in full lines.

The output $a-a_1$ of subtraction unit 24*c* is applied, on the one hand as analogue magnitude (after conversion in a digital-analogue transformer 93 of known type), to a recording apparatus 62, similar to recorder 62 of FIG. 1 and delivering a curve C similar to the one shown on FIG. 3, and, on the other hand, to a digital writing apparatus as a telewriter or telescriptor 88 which inscribes on a paper tape the difference $a-a_1$. In a preferred embodiment, on said paper tape, is inscribed not only the digital output of unit 24*c* i.e. a value which is substantially zero in thet absence of a jacket failure and which increases with said failure), but also the number of pulses corresponding to $a_1$ (output of unit 87) and to $p/p_0$ picked up from calculating unit 87 (which calculates first $p/p_0$ before multiplying, by said correcting factor, the values of $a_0$), thereby enabling the relative values (i.e. $a-a_1$) to be compared to the absolute values (i.e. $a$ or $a_1$) of the activities of each channel and in the same time giving valuable indications on the total activity of the reactor (factor $p/p_0$).

In FIG. 5 there was also schematically shown a rotating switch with two discs or drums $40a$ and $41a$ realizing the selection of valves 18, e.g. as hereinabove explained with reference to FIG. 1 for the rotating switch with discs 40 and 41 by means of two sets of relays of the type 38—36 and 39—37 (the elements 32 and 33 being useless in the present embodiment as the selection is performed when "reading" the stored activities). Therefore, each drum $40a$, $41a$ carries a conducting arm $42a$, $43a$ which cooperates with stationary contacts $44a$ and $45a$ respectively.

On the drawing was illustrated a schematic line 89 showing that the successive opening of valves 18 is realized under the control of rotating switch $40a$—$41a$; it is possible, if desired, to visualize, through an opening 90, the serial number of the channel 4 (or set of channels) which is monitored at each moment.

At 91 was shown the step-by-step driving device of first drum $40a$ (a rotation of a whole turn of said drum having as result the advance of one step of drum $41a$, as the drums in an arithmetic counter), said device being similar to the one used for rotating step-by-step disc 40.

As in the embodiment of FIG. 4, it is possible also in the case of an analogous embodiment, to prevent using a supplementary detector (detector $19a$) counting the total activity or power of the reactor, and therefore, it is sufficient, for example, to provide means for calculating the mean value of the indications delivered by detector 19 during one complete cycle (i.e. during the analysis of all the channels of group E), this mean value being affected only slightly by the burst of a jacket, but depending directly on the gross activity of the reactor. It is also possible to calculate the mean value of the activiites of all channels 4, i.e. of the channels of all groups E.

An embodiment using means for calculating the mean activity is represented in FIG. 6, in which same reference numerals as in FIG. 5 were used for representing similar elements.

In this FIG. 6 is again represented the detector 19 with its amplifiers 82 and 83, the elements disposed upstream said detector being identical to the analogous elements represented in FIG. 5.

The output of discriminator 84 is applied, on one hand, through a digital calculating unit 92 determining by well-known arithmetic units the mean value of $a$ (or $a_n$) at the reference moment), on a complete cycle, said mean value being substantially equal to $p$ (or $p_n$) at one of the input terminals $86a$ of a double switch 86 and, on the other hand directly, to the other input terminal $86b$ of double switch 86. At the reference moment, when said double switch occupies the position shown in broken lines, the various values $a_0$ of the channel activities of the group E during one cycle and the mean value $p_0$ of these values are inscribed and stored in a memory $M_1$ which may be of the same type as in the embodiment of FIG. 5 (for example a magnetic drum 85). On the contrary, during the operation, when the switch is in the position shown in full lines, the actual values $a$ and $p$ are fed respectively in the units $24c$ and 87. The outputs $a_0$ and $p_0$ of memory $M_1$ as well as the output $p$ from unit 92 are dealt with in calculating unit 87 (similar to unit 37 of FIG. 5) in order to calculate.

$$a_1 = \frac{a_0 \times p}{p_0}$$

the output $a_1$ being applied to comparator $24c$ simultaneously with the output $a$ of discriminator 84. The other elements (88, 93, 62, C) of the detection device of FIG. 6 are similar to the corresponding elements of FIG. 5 having same reference numerals.

The invention has been described in detail as applied to a nuclear reactor wherein the moderator is constituted by a solid block traversed by a plurality of horizontal or vertical channels; but the invention may of course be applied to any nuclear reactor cooled by a fluid, for example a breeder reactor comprising elements of fertile matter dipping in a liquid moderator and cooled by fluid streams. The fluid streams leaving each fertile element may thus be treated in the same manner as described for the fluid streams leaving channels 4.

It is why it should be understood that the invention is not limited to the described and illustrated embodiments, but that it may comprise modifications which will readily occur to someone known in the art, especially as concerns:

The means (as elements 19, 20, 21 and the electronical associated units) for detecting the radioactivity, the neutronic activity or other ionizing activity of the various fluid streams;

The memory (M or $M_1$);

The means for performing the successive cyclic control of the various valves 18, or other elements, controling the arrival of samples of the coolant fluid in a common collector passing in front of the activity detecting means;

Particularly in the case of the analogous embodiments, the means for performing the switching of the various outputs (sliders 30) of the elementary memories on a common exit (line 27);

The comparison unit (24 or $24c$);

The means for directing simultaneously on the comparison unit, digital or analogous indications representing, on the one hand, the actual activity of one channel, and on the other hand the activity of same channel at the reference moment, corrected by a factor taking account of the reactor power level variations;

The means for determining the actual power and the reference power of the reactor;

The means for determining the mean value or the total value of the ionizing activity of all the channels or of a group of channels when this mean or total value is used to determine the power of the reactor.

What we claim is:

1. A device for detecting leaks in the jackets of jacketed bodies of fissionable material disposed into a heterogeneous neutronic reactor, cooled by a series of fluid streams circulating through said reactor in heat-exchange relationship with said jacketed bodies, comprising at least one detector for determining the activity of the ionizing radiations, means for bringing representative samples of said fluid streams in front of said at least one detector in order to permit the determination of the ionizing activity thereof, means for storing the successive indications of said at least one detector for said fluid stream at a reference moment for a reference power of said reactor, means for determining the power of said reactor, means for correcting the stored indications so as to obtain corrected stored activities referred to the actual power of said reactor, means for comparing, for each fluid stream, the actual value of the ionizing activity of said stream, as determined by said at least one detector, to said corrected stored activity thereof, and means for visualizing the difference between said actual value and said corrected stored activity, for said fluid streams.

2. A device according to claim 1, wherein said means for bringing representative samples comprise a pipe for each fluid stream, a valve controlling each pipe, and wherein the pipes bringing samples of a same group of fluid streams end in a common collector, means being provided for cyclically opening said valves one by one.

3. A device according to claim 2, wherein said detector is constituted by a Geiger-Müller counter disposed in a room wherein ends said collector.

4. A device according to claim 1, wherein said detector comprises a scintillation counter.

5. A device according to claim 1, further comprising means for precipitating the charges of the representative samples and for bringing the precipitated charges in front of said detector.

6. A device according to claim 1, wherein said detector comprises an ionization chamber detecting the neutron activity.

7. A device according to claim 1, wherein said detector feeds an apparatus having an analogic output representative of the output of said detector.

8. A device according to claim 1, wherein said means for detecting the power of the reactor comprise a computing unit calculating said power from the neutronic power of the reactor and from the mass flow of coolant fluid circulating through said reactor.

9. A device according to claim 1, wherein said means for determining the power of the reactor comprise a computing unit for determining the mean value of the ionizing activities from a great number of fluid streams of the reactor.

10. A device for detecting leaks in the jackets of jacketed bodies of fissionable material disposed into a heterogeneous neutronic reactor, cooled by a series of fluid streams circulating through said reactor in heat-exchange relationship with said jacketed bodies, comprising at least one detector for determining the activity of the ionizing radiations, duct means for bringing representative samples of said fluid streams in front of said at least one detector in order to permit the determining of the ionizing activities thereof, a plurality of elementary memory elements, one for each fluid stream, for storing, by the position of a movable piece for each elementary memory element, the successive indications of said at least one detector for said fluid streams at a reference moment for a reference power of said reactor, means for determining the power of said reactor, means for deducting, from the stored indications, corrected stored activities referred to the actual power of said reactor, means for comparing, for each fluid stream, the actual value of the ionizing activity of said stream, as determined by said at least one detector, to said corrected stored activity thereof, and means for visualizing the difference between said actual value and said corrected stored activity, for said fluid streams.

11. A device according to claim 10, wherein said memory elements are constituted by potentiometers which are all fed in parallel by a voltage substantially proportional to the power of the reactor and which comprise each a slider supplying in turn one of the entries of said comparing means.

12. A device according to claim 11, wherein the valves for a group of fluid streams are disposed according to a table, as well as said potentiometers, said device further comprising a table of double switches arranged so that the actuating circuit of a valve which occupies a certain position in the table thereof includes one switch of the double switch occupying the corresponding position in its own table, and wherein the output of the slider of the potentiometer occupying the corresponding position in its own table is controlled by a second switch of said double switch, the simultaneous actuation of the double switch of each column of the table thereof being performed by the excitation of a coil from a first series of relays, whereas the coils from a second series of relays actuate each a second set of double switches which control, on the one hand, the output of the potentiometers arranged along a same line in the table thereof and, on the other hand, the actuating circuit of the valve disposed according to a same line in the table thereof.

13. A device for detecting leaks in the jackets of jacketed bodies of fissionable material disposed into a heterogeneous neutronic reactor, cooled by a series of fluid streams circulating through said reactor in heat-exchange relationship with said jacketed bodies, comprising at least one detector for determining the activity of the ionizing radiations, duct means for bringing representative samples of said fluid streams in front of said at least one detector in order to permit the determination of the ionizing activities thereof, means for determining the power of said reactor, pulse amplifying and shaping means receiving the output of said detector and having a digital output representative of the output of said detector, means for storing under digital form the successive outputs of said amplyfing and shaping means and the power of said reactor at a reference moment for a reference power of said reactor, means for calculating, from the stored indications, corrected stored activities referred to the actual power of said reactor, means for comparing, for each fluid stream, the actual value of the ionizing activity of said stream, as determined by said at least one reactor, to said corrected stored activity thereof, and means for visualizing the difference between said actual value and said corrected stored activity, for said fluid streams.

14. A device for detecting leaks in the jackets of jacketed bodies of fissionable material disposed into a heterogeneous neutronic reactor, cooled by a series of fluid streams circulating through said reactor in heat-exchange relationship with said jacketed bodies, comprising at least one detector for determining the activity of the ionizing radiations, means for bringing representative samples of said fluid streams in front of said at least one detector in order to permit the determination of the ionizing activity thereof, means for storing the successive indications of said at least one detector for said fluid stream at a reference moment for a reference power of said reactor, a further detector and a further duct means supplying said further detector with a sample picked up from a plurality of fluid streams thereby rendering the output of said further detector representative of the power of said reactor, means for correcting the stored indications so as to obtain stored activities referred to the actual power of said reactor, means for comparing, for each fluid stream, the actual value of the ionizing activity of said stream, as determined by said at least one detector, to said corrected stored activity thereof, and means for visualizing the difference between said actual value and said corrected stored activity, for said fluid streams.

15. A device according to claim 14, wherein said means for correcting the stored values are constituted by a computing unit performing the product of these values by a coefficient substantially equal to the ratio of the actual power of the reactor to the power thereof at the reference moment.

16. A device according to claim 14, wherein the output of said comparing means is applied to a recording apparatus.

17. A device according to claim 14, wherein said comparing means are constituted by a unit determining the difference between the output of the apparatus which follows the detector and the corrected stored values.

18. A device according to claim 17, further comprising means for interrupting, during a portion of the time alloted to explore each fluid stream, one of the inputs of said comparing means.

References Cited in the file of this patent

UNITED STATES PATENTS

| 2,599,922 | Kanne | June 10, 1952 |
| 2,741,592 | Borst et al. | Apr. 10, 1956 |
| 2,802,951 | Seevers | Aug. 13, 1957 |
| 2,823,179 | Snell et al. | Feb. 11, 1958 |
| 2,866,900 | Busignies et al. | Dec. 30, 1958 |

OTHER REFERENCES

Monitor Measures Air and Surface Contamination, by Watts et al., from Nuuleonics, vol, 13, No. 1, January 1955, pages 51 and 52.

Starting up EBWR, by J. W. Harrer, from Nucleonics, July 1957, pages 60 to 64.